United States Patent
Obrecht et al.

(10) Patent No.: US 9,321,910 B2
(45) Date of Patent: *Apr. 26, 2016

(54) MICROGEL-CONTAINING VULCANIZABLE COMPOSITION BASED ON HYDROGENATED NITRILE RUBBER

(71) Applicant: LANXESS Deutschland GmbH, Cologne (DE)

(72) Inventors: Werner Obrecht, Moers (DE); Claus Wrana, Cologne (DE)

(73) Assignee: LANXESS Deutschland GmbH, Cologne, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,882

(22) Filed: Mar. 21, 2014

(65) Prior Publication Data

US 2014/0205782 A1 Jul. 24, 2014

Related U.S. Application Data

(63) Continuation of application No. 13/333,017, filed on Dec. 21, 2011, now Pat. No. 8,716,407, which is a continuation of application No. 11/636,943, filed on Dec. 11, 2006, now abandoned.

(30) Foreign Application Priority Data

Dec. 14, 2005 (DE) .......... 10 2005 059 625

(51) Int. Cl.
*C08L 9/02* (2006.01)
*C08K 5/18* (2006.01)
*C08K 3/36* (2006.01)
*C08K 5/14* (2006.01)
*C08L 15/00* (2006.01)
*C08L 21/00* (2006.01)
*C08C 19/02* (2006.01)

(52) U.S. Cl.
CPC ... *C08L 9/02* (2013.01); *C08K 5/14* (2013.01); *C08L 15/00* (2013.01); *C08L 21/00* (2013.01); *C08C 19/02* (2013.01); *Y10T 428/139* (2015.01); *Y10T 428/1386* (2015.01)

(58) Field of Classification Search
USPC .......... 524/500, 529; 525/193, 215, 233, 263, 525/274, 329.1, 329.21, 332.5, 338, 368
See application file for complete search history.

(56) References Cited

U.S. PATENT DOCUMENTS

| | | | |
|---|---|---|---|
| 3,700,637 A | 10/1972 | Finch, Jr. | |
| 4,404,329 A | 9/1983 | Maeda et al. | |
| 4,464,515 A | 8/1984 | Rempel et al. | |
| 4,581,417 A | 4/1986 | Buding et al. | |
| 4,631,315 A | 12/1986 | Buding et al. | |
| 4,746,707 A | 5/1988 | Fiedler et al. | |
| 4,795,788 A | 1/1989 | Himmler et al. | |
| 4,963,621 A | 10/1990 | Szentivanyi et al. | |
| 5,124,408 A * | 6/1992 | Engels et al. | 525/215 |
| 5,208,294 A * | 5/1993 | Brown | 525/263 |
| 5,302,696 A | 4/1994 | Schiessl | |
| 5,391,627 A * | 2/1995 | Araki et al. | 525/274 |
| 5,395,891 A * | 3/1995 | Obrecht et al. | 525/194 |
| 5,442,009 A | 8/1995 | Parker et al. | |
| 6,127,488 A | 10/2000 | Obrecht et al. | |
| 6,133,364 A | 10/2000 | Obrecht et al. | |
| 6,184,296 B1 | 2/2001 | Obrecht et al. | |
| 6,207,757 B1 | 3/2001 | Obrecht et al. | |
| 6,242,534 B1 | 6/2001 | Obrecht et al. | |
| 6,372,857 B1 | 4/2002 | Obrecht et al. | |
| 6,399,706 B1 | 6/2002 | Obrecht et al. | |
| 6,579,945 B2 | 6/2003 | Obrecht et al. | |
| 6,620,866 B1 | 9/2003 | Obrecht et al. | |
| 6,620,886 B2 | 9/2003 | Obrecht et al. | |
| 6,632,888 B2 | 10/2003 | Obrecht et al. | |
| 6,649,696 B2 | 11/2003 | Obrecht et al. | |
| 6,683,136 B2 | 1/2004 | Guo et al. | |
| 6,737,478 B2 | 5/2004 | Obrecht et al. | |
| 6,800,708 B2 | 10/2004 | Melchiors et al. | |
| 7,235,601 B2 * | 6/2007 | Guerin et al. | 524/565 |
| 7,262,244 B2 * | 8/2007 | Guerin | 524/565 |
| 8,716,407 B2 * | 5/2014 | Obrecht et al. | 525/193 |
| 2001/0051685 A1 * | 12/2001 | Obrecht et al. | 524/526 |
| 2004/0110888 A1 * | 6/2004 | Guerin et al. | 524/492 |
| 2004/0113320 A1 * | 6/2004 | Guerin | 264/328.2 |

FOREIGN PATENT DOCUMENTS

| | | |
|---|---|---|
| DE | 19701487 A1 | 7/1998 |
| EP | 0112109 A1 | 6/1984 |
| EP | 0471250 A1 | 2/1992 |
| GB | 1078400 A | 8/1967 |
| GB | 1558491 A | 1/1980 |

\* cited by examiner

*Primary Examiner* — Irina S Zemel
*Assistant Examiner* — Jeffrey Lenihan

(57) ABSTRACT

A novel vulcanizable composition is provided, based on at least one hydrogenated nitrile rubber, on at least one peroxide, on at least one unsaturated carboxylic acid and/or salts thereof, and also on specific microgels. These vulcanizable compositions can be used to obtain vulcanized products which can in particular be used for drive belts, roll coverings, hoses and cables.

22 Claims, No Drawings

MICROGEL-CONTAINING VULCANIZABLE COMPOSITION BASED ON HYDROGENATED NITRILE RUBBER

This application is a continuation of pending U.S. patent application Ser. No. 13/333,017 filed Dec. 21, 2011, which is a continuation of U.S. patent application Ser. No. 11/636,943, filed Dec. 11, 2006, now abandoned, which claims the benefit of priority of German patent application No. 10 2005 059 625.8 filed Dec. 14, 2005, all incorporated herein by reference.

FIELD OF THE INVENTION

The present invention relates to a microgel-containing vulcanizable composition based on hydrogenated nitrile rubber and to its preparation, and moreover to vulcanized products produced therefrom and to their use in particular in drive belts, in roll coverings, in gaskets, in hoses and in cables.

BACKGROUND OF THE INVENTION

The production of vulcanized rubber items based on hydrogenated nitrile rubbers is known in particular for drive belts, roll coverings, gaskets, hoses and cables. If the items based on partially hydrogenated nitrile rubbers are produced via sulphur vulcanization according to DE-A-29 139 92 or EP-A-0 265 706, the properties of these rubber items then become inadequate in particular at the high temperatures nowadays encountered in various applications. Vulcanisates with better ageing resistance are obtained on the basis of more highly hydrogenated nitrile rubbers which are vulcanized with sulphur according to EP-A-0 112 109, or with the aid of organic peroxides according to DE-A-34 38 414, or else with inorganic peroxides according to EP-A-0 383 127. However, the hardness and also the tensile stress values at various tensile strain values can still be improved, both at room temperature and at higher temperatures, for example at 130° C. Additions of salts of unsaturated carboxylic acids is a successful method in the case of peroxidically vulcanized nitrile rubbers for improving hardness and the level of modulus, both at room temperature and at 130° C. The salts of the unsaturated carboxylic acids here can be prepared "in situ" (U.S. Pat. No. 5,391,627) during preparation of the compounded material from the oxides and the corresponding unsaturated carboxylic acids. However, according to U.S. Pat. No. 5,208,294 it is also possible to add the salts of the unsaturated carboxylic acids directly. In this case, the salts of the unsaturated carboxylic acids are prepared in a separate step of a process or are purchased.

However, with the aim of further improvement in the property profile of vulcanized rubber items based on hydrogenated nitrile rubbers, in particular for use in drive belts, in rolls, in gaskets, in hoses and in cables, a further improvement in mechanical properties is desirable and specifically also at high temperatures of 130° C. or above, these being temperatures that can particularly and increasingly arise in automobile applications. The intention is that this improved property profile is to be retained even over a prolonged period of storage at these temperatures. However, at the same time the intention is that rubber items improved in this way have unaltered good hardness values.

The use of rubber gels, also termed microgels, is known for underlying control of the properties of vulcanisates (e.g. EP-A-0 405 216, DE-A 42 20 563, GB Patent 1078400, DE-A-197 01 487, DE-A-197 01 489, DE-A-197 01 488, DE-A-198 34 804, DE-A-198 34 803, DE-A-198 34 802, EP-A-1 063 259, DE-A-199 39 865, DE-A-199 42 620, DE-A-199 42 614, DE-A-100 21 070, DE-A-100 38 488, DE-A-100 39 749, DE-A-100 52 287, DE-A-100 56 311 and DE-A-100 61 174). These specifications disclose improvement of various vulcanisate properties via additions of microgels, but not with the focus on high-temperature applications.

SUMMARY OF THE INVENTION

The object of the present invention consisted in providing vulcanisates which are based on hydrogenated nitrile rubbers and which have markedly improved mechanical properties, in particular at high temperatures, such as 130° C., and also after storage in hot air at 150° C.

Surprisingly, this object could be achieved by starting from a vulcanizable composition which is based on a combination composed of a hydrogenated nitrile rubber, of an unsaturated carboxylic acid or of a salt thereof, of a peroxide and of specific microgels.

DETAILED DESCRIPTION OF THE INVENTION

The invention therefore provides vulcanizable compositions comprising
  a) one or more hydrogenated nitrile rubbers,
  b) one or more unsaturated carboxylic acids and/or one or more salts thereof,
  c) at least one peroxide and
  d) at least one microgel whose glass transition temperature is below −20° C.

This method of achieving the object was surprising insofar as microgels whose glass transition temperature is below −20° C. are prepared using dienes, such as butadiene, isoprene, inter alia and therefore contain double bonds which are susceptible to ageing processes. According to ASTM D2000, it is to be expected that use of double-bond-containing rubber gels (the materials known as "R rubbers") is likely to impair ageing resistance at 150° C., since according to ASTM D2000 a maximum use temperature <100° C. is to be assumed for double-bond-containing rubber gels.

However, when the specific microgels are used in the inventive vulcanizable compositions the level of mechanical properties of the corresponding vulcanisates is markedly improved both at an operating temperature of 130° C. and after storage in hot air at 150° C. These improvements are not possible when using the vulcanizable compositions known hitherto of hydrogenated nitrile rubbers, which comprise no microgels. For example, no property improvement at high temperatures is achieved in a composition of this type solely via an increase in the amount of zinc diacrylate. The result when the inventive compositions are used is not only the property improvement at high temperatures but also retention of unaltered good mechanical properties at room temperature, and high hardness values at low density.

The inventive compositions moreover lead to advantages in relation to the production process for the vulcanized products. The vulcanized products are often produced by way of injection-moulding processes. The vulcanisates of the inventive microgel-containing compositions here have less tack and are therefore easier to demould, and this leads to less mould soiling in the production process. The inventive microgel-containing compositions moreover give an unaltered scorch time (e.g. $t_{10}$) with, simultaneously, a short full-vulcanization time ($t_{90}$ and $t_{95}$).

Hydrogenated Nitrile Rubbers:
  For the purposes of this application, hydrogenated nitrile rubbers are co- and/or terpolymers based on at least one conjugated diene and on at least one α,β-unsaturated nitrile monomer and also if appropriate on other copolymerizable monomers, in which the diene units incorporated into the polymer have been entirely or to some extent hydrogenated. The degree of hydrogenation of the diene units incorporated into the polymer is usually in the range from 50 to 100%, preferably in the range from 85 to 100% and particularly preferably in the range from 95 to 100%.

The conjugated diene can be of any type. It is preferable to use ($C_4$-$C_6$) conjugated dienes. Particular preference is given to 1,3-butadiene, isoprene, 2,3-dimethylbutadiene, piperylene or a mixture thereof. Particular preference is given to 1,3-butadiene and isoprene or a mixture thereof. 1,3-butadiene is very particularly preferred.

The α,β-unsaturated nitrile used can comprise any known α,β-unsaturated nitrile, and preference is given to ($C_3$-$C_5$) α,β-unsaturated nitriles, such as acrylonitrile, methacrylonitrile, ethacrylonitrile or a mixture of these. Acrylonitrile is particularly preferred.

Other copolymerizable monomers are unsaturated carboxylic acids, and also the esters of the unsaturated carboxylic acids.

The unsaturated carboxylic acids are preferably mono- or dicarboxylic acids having from 3 to 16 carbon atoms, with α,β-unsaturation. Examples of the α,β-unsaturated carboxylic acids are: acrylic acid, methacrylic acid, itaconic acid, fumaric acid, maleic acid, crotonic acid and mixtures thereof.

Esters of the α,β-unsaturated carboxylic acids having from 3 to 16 carbon atoms preferably encompass the alkyl esters and the alkoxyalkyl esters of the abovementioned carboxylic acids. Preferred esters of the α,β-unsaturated carboxylic acids having from 3 to 16 carbon atoms are methyl acrylate, ethyl acrylate, butyl acrylate, 2-ethylhexyl acrylate and octyl acrylate. Preferred alkoxyalkyl esters are methoxyethyl acrylate, ethoxyethyl acrylate and methoxyethyl acrylate, and also mixtures of the same.

The proportions of conjugated diene and of α,β-unsaturated nitrile in the hydrogenated nitrile rubbers can be varied widely. The proportion of the conjugated diene or of the entirety of the conjugated dienes is usually in the range from 40 to 90% by weight and preferably in the range from 50 to 80% by weight, based on the entire polymer. The proportion of the α,β-unsaturated nitrile or of the entirety of the α,β-unsaturated nitriles is usually from 10 to 60% by weight, preferably from 20 to 50% by weight, based on the entire polymer. The amounts that can be present of the additional monomers are from 0.1 to 40% by weight, preferably from 1 to 30% by weight, based on the entire polymer. In this case, corresponding proportions of the conjugated diene(s) and/or of the α,β-unsaturated nitrile(s) are replaced via the proportions of the additional monomers, and the proportions of all of the monomers here in each case give a total of 100% by weight.

The preparation of hydrogenated nitrile rubbers of this type which are suitable for the inventive vulcanizable compositions is very familiar to the person skilled in the art.

The initial preparation of the nitrile rubbers via polymerization of the abovementioned monomers is extensively described in the literature (e.g. Houben-Weyl, Methoden der Organischen Chemie [Methods of organic chemistry], Vol. 14/1, Georg Thieme Verlag Stuttgart 1961).

The subsequent hydrogenation of the nitrile rubbers described above to give hydrogenated nitrile rubber can take place in the manner known to the person skilled in the art. By way of example, a suitable method is reaction with hydrogen with use of homogeneous catalysts, e.g. the catalyst known as "Wilkinson" catalyst (($PPh_3$)$_3$RhCl) or others. Processes for the hydrogenation of nitrile rubber are known. Rhodium or titanium are usually used as catalysts, but platinum, iridium, palladium, rhenium, ruthenium, osmium, cobalt or copper can also be used either in the form of metal or else preferably in the form of metal compounds (see, for example, U.S. Pat. No. 3,700,637, DE-A-2 539 132, EP-A-134 023, DE-A-35 41 689, DE-A-35 40 918, EP-A-298 386, DE-A-35 29 252, DE-A-34 33 392, U.S. Pat. No. 4,464,515 and U.S. Pat. No. 4,503,196).

Suitable catalysts and solvents for homogeneous-phase hydrogenation are described below and are also disclosed in DE-A-25 39 132 and EP-A-0 471 250.

Selective hydrogenation can be achieved, for example, in the presence of a rhodium-containing catalyst. By way of example, a catalyst of the general formula

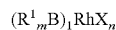

can be used, in which $R^1$ are identical or different and are a $C_1$-$C_8$-alkyl group, a $C_4$-$C_8$-cycloalkyl group, a $C_6$-$C_{15}$-aryl group or a $C_7$-$C_{15}$-aralkyl group, B is phosphorus, arsenic, sulphur or a sulphoxide group S=O X is hydrogen or an anion, preferably halogen and particularly preferably chlorine or bromine, l is 2, 3 or 4, m is 2 or 3 and n is 1, 2 or 3, preferably 1 or 3.

Preferred catalysts are tris(triphenylphosphine)rhodium(I) chloride, tris(triphenyl-phosphine)rhodium(III) chloride and tris(dimethyl sulphoxide)rhodium(III) chloride, and also tetrakis(triphenylphosphine)rhodium hydride of the formula (($C_6H_5$)$_3$P)$_4$RhH and the corresponding compounds in which the triphenylphosphine has been entirely or to some extent replaced by tricyclohexylphosphine. Small amounts of the catalyst can be used. A suitable amount is in the range from 0.01 to 1% by weight, preferably in the range from 0.03 to 0.5% by weight and particularly preferably in the range from 0.1 to 0.3% by weight, based on the weight of the polymer.

It is usually advisable to use the catalyst together with a co-catalyst which is a ligand of the formula $R^1{}_m$B, where $R^1$, m and B are as defined above for the catalyst. m is preferably equal to 3, B is preferably equal to phosphorus, and the radicals $R^1$ can be identical or different. The co-catalysts preferably have trialkyl, tricycloalkyl, triaryl, triaralkyl, diarylmonoalkyl, diarylmonocycloalkyl, dialkylmonoaryl, dialkylmonocycloalkyl, dicycloalkylmonoaryl or dicycloalkylmonoaryl radicals.

Suitable co-catalysts are found by way of example in U.S. Pat. No. 4,631,315. Triphenylphosphine is preferred co-catalyst. The amounts used of the co-catalyst are preferably from 0.3 to 5% by weight, preferably in the range from 0.5 to 4% by weight, based on the weight of the nitrile rubber to be hydrogenated. The ratio by weight of the rhodium-containing catalyst to the co-catalyst is moreover preferably in the range from 1:3 to 1:55, preferably in the range from 1:5 to 1:45. A suitable method uses from 0.1 to 33 parts by weight of the co-catalyst, preferably from 0.5 to 20 parts by weight and particularly preferably from 1 to 5 parts by weight, in particular more than 2 but less than 5 parts by weight, of co-catalyst, based on 100 parts by weight of the nitrile rubber to be hydrogenated.

The practical method for these hydrogenations is well known to the person skilled in the art from U.S. Pat. No. 6,683,136, for example. In the usual method, the nitrile rubber to be hydrogenated is treated with hydrogen in a solvent such as toluene or monochlorobenzene at a temperature in the range from 100 to 150° C. and at a pressure in the range from 50 to 150 bar for from 2 to 10 h.

The Mooney viscosity of the hydrogenated nitrile rubbers used in the inventive process (ML 1+4 @100° C.) is in the range from 10 to 120 MU, preferably in the range from 15 to 100 MU, where the Mooney viscosity is determined to ASTM standard D1646.

Hydrogenated nitrile rubbers of this type are commercially available. Examples of hydrogenated nitrile rubber are fully and partially hydrogenated nitrile rubbers with acrylonitrile contents in the range from 20 to 50% by weight (Therban® range from Lanxess Deutschland GmbH, and also Zetpol® range from Nippon Zeon Corporation), Examples of hydrogenated butadiene-acrylonitrile-acrylate polymers are the Therban® LT range from Lanxess Deutschland GmbH, e.g. Therban® LT 2157, and also Therban® VP KA 8882. An example of carboxylated hydrogenated nitrile rubber is the Therban® XT range from Lanxess Deutschland GmbH. Examples of hydrogenated nitrile rubbers with low Mooney viscosities and therefore with improved processability are products from the Therban® AT range, e.g. Therban AT VP KA 8966.

Unsaturated Carboxylic Acids and/or One or More Salts Thereof:

The inventive vulcanizable composition comprises one or more unsaturated carboxylic acids and/or one or more salts thereof. This component is concomitantly incorporated to some extent into the network during subsequent peroxidic vulcanization. The unsaturated carboxylic acid is preferably an α,β-ethylenically unsaturated mono- or dicarboxylic acid having from 3 to 10 carbon atoms, e.g. acrylic acid, methacrylic acid, cinnamic acid, crotonic acid or itaconic acid. Acrylic acid and methacrylic acid are particularly preferred. Suitable metal salts are those of sodium, potassium, magnesium, calcium, zinc, barium, aluminium, tin, zirconium, lithium. Sodium, zinc, magnesium and aluminium are particularly preferred. Metal diacrylates are particularly preferred, in particular zinc diacrylate, and metal dimethacrylates, in particular zinc dimethacrylate.

Based on 100 pars by weight of the hydrogenated nitrile rubbers the inventive compositions preferably use from 1 to 100 parts by weight, more preferably from 5 to 80 parts by weight of the unsaturated carboxylic acids and/or one or more salts thereof, preferably of the α,β-ethylenically unsaturated mono- or dicarboxylic acids having from 3 to 10 carbon atoms or of one or more salts thereof. According to the invention it is also possible to prepare the salt(s) of the α,β-unsaturated mono- or dicarboxylic acid(s) during the preparation of the inventive vulcanizable composition ("compounding") or during subsequent vulcanization "in situ".

Peroxide:

The inventive vulcanizable composition moreover comprises at least one peroxide preferably selected from organic peroxides, in particular being dicumyl peroxide, tert-butyl cumyl peroxide, bis(tert-butylperoxyisopropyl)benzene, di-tert-butyl peroxide, 2,5-dimethylhexane 2,5-dihydroperoxide, 2,5-dimethylhex-3-yne 2,5-dihydroperoxide, dibenzoyl peroxide, bis(2,4-dichlorobenzoyl) peroxide, tert-butyl perbenzoate, butyl 4,4-di(tert-butylperoxy)valerate or 1,1-bis(tert-butylperoxy)-3,3,5-trimethylcyclohexane. However, it is also possible to use the peroxides mentioned at a later stage below for microgel preparation. The total amount of the peroxide(s) used is preferably from 0.2 to 8 parts by weight, particularly preferably from 0.2 to 5 parts by weight, in particular from 0.2 to 4 parts by weight, based on 100 parts by weight of the hydrogenated nitrile rubbers.

Microgel Whose Glass Transition Temperature is Below −20° C.:

The glass transition temperature of the microgels that can be used in the inventive vulcanizable composition is below −20° C.

The microgel used in the inventive vulcanizable composition is usually a crosslinked microgel based on homopolymers or on random copolymers. The inventively used microgels are therefore usually crosslinked homopolymers or crosslinked random copolymers. The expressions homopolymers and random copolymers are well known to the person skilled in the art and are explained by way of example in Vollmert, Polymer Chemistry, Springer 1973.

The glass transition temperatures of the microgels are generally higher by from 1° C. to 10° C. than the glass transition temperatures of the corresponding non-crosslinked homo- or copolymers, and, to a first approximation, the glass transition temperatures of the microgels here rise proportionally with the degree of crosslinking. In the case of weakly crosslinked microgels, the glass transition temperatures are higher only by about 1° C. than those of the corresponding homo- or copolymers. In the case of highly crosslinked microgels, the glass transition temperatures can be higher by up to 10° C. than the glass transition temperatures of the corresponding non-crosslinked homo- or copolymers. The glass transition temperatures of the underlying non-crosslinked copolymers can be calculated (Vollmert, Polymer Chemistry, Springer 1973) with the aid of the Gordon-Taylor relationship or of the Fox-Flory relationship. These calculations give good results if the following glass transition temperatures of the corresponding homopolymers are input: polybutadiene: −80° C., polyisoprene: −65° C., polychloroprene: −39° C., polystyrene: 100° C. and polyacrylonitrile 100° C.

The microgels used in the inventive vulcanizable composition advantageously have at least 70% by weight of fractions ("gel content") insoluble in toluene at 23° C., preferably at least 80% by weight, and particularly preferably at least 90% by weight. This fraction insoluble in toluene is determined in toluene at a temperature of 23°. 250 mg of the microgel are swollen here in 25 ml of toluene at 23° C. for 24 hours, with shaking. After centrifuging at 20 000 rpm, the insoluble fraction is isolated and dried. The gel content is found by taking the quotient of the dried residue and the starting weight and is stated in percent by weight.

The microgels used in the inventive vulcanizable composition usually have a swelling index ("SI") in toluene at 23° C. of less than 80, preferably less than 60 and in particular less than 40. The swelling index of the microgels is particularly preferably in the range from 1 to 30, in particular in the range from 1 to 20. The swelling index SI is calculated from the weight of the solvent-containing microgel swollen for 24 hours in toluene at 23° C. (after centrifuging at 20 000 rpm) and the weight of the dry microgel by using the following formula:

SI=wet weight of microgel/dry weight of microgel.

To determine the swelling index, 250 mg of the microgel are allowed to swell in 25 ml of toluene for 24 h, with shaking. The gel is removed by centrifuging and weighed and is then dried to constant weight at 70° C. and again weighed.

The glass transition temperatures $T_g$ of the microgels used in the inventive vulcanizable composition are preferably in the range from −100° C. to −20° C., particularly preferably in the range from −80° C. to −20° C. and in particular in the range from −80° C. to −50° C.

The width of the glass transition ("$\Delta T_g$") of the microgels used is usually moreover greater than 5° C., preferably greater than 10° C., particularly preferably greater than 20° C. Microgels having this width of glass transition are generally unlike completely homogeneous microgels obtained, for example, via radiation crosslinking, in not having completely homogeneous crosslinking. A consequence of this is that the change in modulus from the matrix phase to the disperse phase is not immediate. A result of this in the event of sudden stress is that break-away effects do not occur between matrix and disperse phase, and there is a resultant favourable effect on mechanical properties, swelling behaviour and buckling behaviour.

The glass transition temperature ($T_g$) of the microgels and the width of their glass transition ($\Delta T_g$) are determined by means of differential scanning calorimetry (DSC). To determine $T_g$ and $\Delta T_g$, two cooling/heating cycles are carried out. $T_g$ and $\Delta T_g$ are determined in the second heating cycle. For the determinations, 10-12 mg of the selected microgel are placed in a Perkin-Elmer DSC specimen container (standard aluminium dish). The first DSC cycle is carried out by first cooling the specimen with liquid nitrogen to −100° C. and then heating it at a rate of 20K/min to +150° C. The second DSC cycle is begun by immediate cooling of the specimen as soon as a specimen temperature of +150° C. has been reached. The cooling rate used is about 320 K/min. In the second heating cycle, the specimen is again heated as in the first cycle to +150° C. The heating rate in the second cycle is again 20 K/min. $T_g$ and $\Delta T_g$ are determined graphically on the DSC curve for the second heating procedure. To this end, three straight lines are drawn on the DSC curve. The 1st straight line is drawn on that section of the DSC curve below $T_g$, the 2nd straight line is drawn on that part of the curve running through $T_g$ with an inflection point, and the 3rd straight line is drawn on that part of the DSC curve above $T_g$. This method gives three straight lines with two intersections. Each of the two intersections is characterized via a characteristic temperature. The glass transition temperature $T_g$ is obtained as the average of these two temperatures and the width of the glass transition $\Delta T_g$ is obtained from the difference between the two temperatures.

The microgels present in the inventive composition are known in principle and can be prepared in a manner known per se (see, for example, EP-A-0 405 216, EP-A-0 854 171, DE-A 42 20 563, GB Patent 1078400, DE-A-197 01 489, DE-A-197 01 488, DE-A-198 34 804, DE-A-198 34 803, DE-A-198 34 802, EP-A-1 063 259, DE-A-199 39 865, DE-A-199 42 620, DE-A-199 42 614, DE-A-100 21 070, DE-A-100 38 488, DE-A-100 39 749, DE-A-100 52 287, DE-A-100 56 311 and DE-A-100 61 174).

The patent applications EP-A 405 216, DE-A-42 20 563 and also GB Patent 1078400 describe the use of CR microgels, BR microgels and NBR microgels in mixtures with double-bond-containing rubbers. DE-A-197 01 489 describes the use of subsequently modified microgels in mixtures with double-bond-containing rubbers such as NR, SBR and BR.

The microgels which can be used in the inventive compositions are usually obtained via crosslinking of the following rubbers:

BR: polybutadiene,
IR: polyisoprene,
SBR: random styrene-butadiene copolymers with styrene contents of 1-60% by weight, preferably 5-50% by weight,
X-SBR: carboxylated styrene-butadiene copolymers,
FKM: fluororubber,
ABR: butadiene-$C_{1-4}$-alkyl acrylate copolymers,
ACM: acrylate rubber,
NBR: nitrile rubbers, i.e. butadiene-acrylonitrile-co- or terpolymers with acrylonitrile contents of 5-60% by weight, preferably 10-50% by weight,
X-NBR: carboxylated nitrile rubbers,
CR: polychloroprene,
IIR: isobutylene-isoprene copolymers with isoprene contents of 0.5-10% by weight,
BIIR: brominated isobutylene-isoprene copolymers with bromine contents of 0.1-10% by weight,
CIIR: chlorinated isobutylene-isoprene copolymers with chlorine contents of 0.1-10% by weight,
HNBR: partially and fully hydrogenated nitrile rubbers,
EPDM: ethylene-propylene-diene copolymers,
EAM: ethylene-acrylate copolymers,
EVM: ethylene-vinyl acetate copolymers,
CO and
ECO: epichlorohydrin rubbers,
Q: silicone rubbers,
AU: polyester urethane polymers,
EU: polyether urethane polymers,
ENR: epoxidized natural rubber or a mixture thereof.

The non-crosslinked microgel starting materials are advantageously prepared by emulsion polymerization.

It is also possible to use naturally occurring latices, e.g. natural rubber latex.

The microgels used in the inventive composition are preferably those obtainable via emulsion polymerization and subsequent crosslinking.

When the inventively used microgels are prepared via emulsion polymerization, examples of the monomers used, capable of free-radical polymerization, are the following:

Butadiene, styrene, acrylonitrile, isoprene, esters of acrylic and methacrylic acid, tetrafluoroethylene, vinylidene fluoride, hexafluoropropene, 2-chlorobutadiene, 2,3-dichlorobutadiene, and also double-bond-containing carboxylic acids, preferably acrylic acid, methacrylic acid, maleic acid or itaconic acid, double-bond-containing hydroxy compounds, preferably hydroxyethyl methacrylate, hydroxyethyl acrylate or hydroxybutyl methacrylate, amine-functionalized acrylates, amine-functionalized methacrylates, acrolein, N-vinyl-2-pyrollidone, N-allylurea and N-allylthiourea, secondary amino (meth)acrylates, e.g. 2-tert-butylaminoethyl methacrylate, and 2-tert-butylaminoethylmethacrylamide.

The crosslinking of the rubber gel can be achieved directly during the emulsion polymerization process via copolymerization with polyfunctional compounds having crosslinking action, or else via subsequent crosslinking as described below.

Direct crosslinking during the emulsion polymerization process is preferred. Preferred polyfunctional comonomers are compounds having at least 2, preferably from 2 to 4 copolymerizable C=C double bonds, e.g. diisopropenylbenzene, divinylbenzene, divinyl ether, divinyl sulphone, diallyl phthalate, triallyl cyanurate, triallyl isocyanurate, 1,2-polybutadiene, N,N'-m-phenylenedimaleimide, N,N'-(4-methyl-m-phenylene)dimaleimide and/or triallyl trimellitate. Other compounds which can also be used are the acrylates and methacrylates of polyhydric, preferably di- to tetrahydric $C_2$-$C_{10}$ alcohols, e.g. ethylene glycol, 1,2-propanediol, 1,4-butanediol, 1,6-hexanediol, neopentyl glycol, glycerol, trimethylolpropane, pentaerythritol and sorbitol. It is also possible to use acrylates and methacrylates of polyethylene glycol having from 2 to 20, preferably 2 to 8, oxyethylene units. It is also possible to use polyesters composed of aliphatic di- and/or polyols, or else maleic acid, fumaric acid and/or itaconic acid.

Crosslinking to give rubber microgels during the emulsion polymerization process can also take place via continuation of the polymerization process as far as high conversions or in the monomer feed process via polymerization with high levels of internal conversion. Another possibility is to carry out the emulsion polymerization process in the absence of regulators.

For crosslinking of the non-crosslinked or weakly crosslinked microgel starting products after the emulsion polymerization process, it is best to use directly the latices obtained during the emulsion polymerization process. This method can also be used to crosslink natural rubber latices.

Crosslinking is carried out with suitable chemicals having crosslinking action. Examples of these suitable chemicals having crosslinking action are organic peroxides, such as dicumyl peroxide, tert-butyl cumyl peroxide, bis(tert-butylperoxy-isopropyl)benzene, di-tert-butyl peroxide, 2,5-dimethylhexane 2,5-dihydroperoxide, 2,5-dimethylhex-3-yne 2,5-dihydroperoxide, dibenzoyl peroxide, bis(2,4-dichlorobenzoyl) peroxide, or tert-butyl perbenzoate, organic azo compounds, such as azobisisobutyronitrile or azobiscyclohexane nitrile, and also di- or polymercapto compounds, such as dimercaptoethane, 1,6-dimercaptohexane, 1,3,5-trimercaptotriazine or mercapto-terminated polysulphide rubbers, such as mercapto-terminated reaction products of bischloroethyl formal with sodium polysulphide.

The ideal temperature for conducting the post-crosslinking process naturally depends on the reactivity of the crosslinking agent; it can be carried out at temperatures of from 20° C. to about 180° C., if appropriate at elevated pressure (see in this connection Houben-Weyl, Methoden der organischen Chemie [Methods of organic chemistry], 4th Edition, Vol. 14/2, page 848).

Particularly Preferred Crosslinking Agents are Peroxides.

The crosslinking of rubbers containing C=C double bonds to give microgels can also take place in dispersion or emulsion with simultaneous, partial to, if appropriate, complete hydrogenation of the C=C double bond via hydrazine (as described in U.S. Pat. No. 5,302,696 or U.S. Pat. No. 5,442,009) or, if appropriate, other hydrogenating agents, such as organometal hydride complexes.

Prior to, during or after the post-crosslinking process it is possible, if appropriate, to carry out a particle enlargement process via agglomeration.

The abovementioned preparation process for the microgels preferably does not give completely homogeneously crosslinked microgels.

Microgels used for the inventive composition can be either modified microgels which have functional groups, and in particular specifically at the surface, or else can be unmodified microgels which in essence have no reactive groups, and in particular specifically none at the surface.

The modification of the microgels can take place either via grafting of the microgels with functional monomers or else via reaction with low-molecular-weight agents.

The aim of the microgel modification is improvement in compatibility of the microgel with the matrix, in order to achieve good dispersibility during preparation and also good coupling to the matrix.

For grafting of the microgels with functional monomers it is advantageous to start from the aqueous microgel dispersion, which is reacted with polar monomers, such as acrylic acid, methacrylic acid, itaconic acid, hydroxyethyl (meth)acrylate, hydroxypropyl (meth)acrylate, hydroxybutyl (meth)acrylate, acrylamide, methacrylamide, acrylonitrile, acrolein, N-vinyl-2-pyrollidone, N-allylurea or N-allylthiourea, or else secondary amino (meth)acrylates, such as 2-tert-butylaminoethyl methacrylate, and 2-tert-butylaminoethylmethacrylamide, under the conditions of free-radical emulsion polymerization. This method gives microgels with core/shell morphology, the intention being that the shell has high compatibility with the matrix. It is desirable that the grafting of the monomer used in the modification step onto the unmodified microgel is as quantitative as possible. The functional monomers are advantageously metered into the mixture prior to the complete crosslinking of the microgels.

Modified microgels having functional groups can moreover be prepared via chemical reaction of the previously crosslinked microgels with low-molecular-weight agents reactive towards C=C double bonds. These reactive chemicals are in particular compounds which can cause chemical bonding of polar groups, e.g. aldehyde groups, hydroxy groups, carboxy groups, nitrile groups, etc., or else sulphur-containing groups, e.g. mercapto groups, dithiocarbamate groups, polysulphide groups, xanthogenate groups, thiobenzothiazole groups and/or dithiophosphoric acid groups and/or unsaturated dicarboxylic acid groups, to the microgels. This also applies to N,N'-m-phenylenediamine.

Examples of suitable agents are:

Hydrogen sulphide and/or alkyl polymercaptans, such as 1,2-dimercaptoethane or 1,6-dimercaptohexane, and also dialkyl- and/or dialkylaryldithiocarbamate, e.g. the alkali metal salts of dimethyldithiocarbamic acid and/or dibenzyldithiocarbamic acid, and also alkyl and/or aryl xanthogenates, such as potassium ethyl xanthogenate and sodium isopropyl xanthogenate, the alkali metal or alkaline earth metal salts of dibutyl dithiophosphoric acid, dioctyl dithiophosphoric acid and/or dodecyl dithiophosphoric acid. The reactions mentioned can advantageously also be carried out in the presence of sulphur, and the sulphur here is concomitantly incorporated with formation of polysulphidic bonds. For the addition reaction with this compound, free-radical initiators can be added, e.g. organic and/or inorganic peroxides and/or azo initiators.

Modification of double-bond-containing microgels for example via ozonolysis or else via halogenation with chlorine, bromine and iodine is also possible. Further reaction of modified microgels, e.g. preparation of hydroxy-group-modified microgels from epoxidized microgels, is also regarded as chemical modification of microgels.

In one preferred embodiment, the microgels have been modified via hydroxy groups, and also in particular at the surface. The hydroxy group content of the microgels in the form of hydroxy number whose dimension is mg KOH/g of polymer is determined via reaction of acetic anhydride and titration of the resultant acetic acid liberated with KOH to DIN 53240. The hydroxy number of the microgels is preferably in the range from 0.1 to 100 mg KOH/g of polymer and particularly preferably in the range from 0.5 to 50 mg KOH/g of polymer.

The amount of the modifier used depends on its activity and on the requirements set in a particular instance and is in the range from 0.05 to 30% by weight, based on the total amount of rubber microgel used, particularly preferably in the range from 0.5 to 10% by weight, based on the total amount of rubber microgel used.

The modification reactions can be carried out at temperatures of 0-180° C., preferably 20-95° C., if appropriate under pressure of 1-30 bar. The modifications can be undertaken on rubber microgels in bulk or in the form of their dispersion, and in the latter instance here a reaction medium used may comprise inert organic solvents or else comprise water. The modification is particularly preferably carried out in aqueous dispersion of the crosslinked rubber.

The average diameter of the microgels prepared can be adjusted with high precision for example to 0.1 micrometer (100 nm)±0.01 micrometer (10 nm), thus, for example, achieving a particle size distribution in which the size of at least 75% by weight of all of the microgel particles is from 0.095 micrometer to 0.105 micrometer. Examples of other feasible average diameters of the microgels are in the range from 5 to 500 nm with the same precision of preparation and use (meaning that at least 75% by weight of all of the particles are within a range of ±10% above and below the maximum of the cumulative grain size distribution curve (determined via ultracentrifugation)). The morphology of the dispersed microgels in the inventive composition can thus be adjusted to practically exactly as required, thus correspondingly influencing the properties of the inventive composition and also of the vulcanisates prepared therefrom by way of example. Particularly fine-particle microgels are prepared via emulsion polymerization via control of the reaction parameters in a manner known per se (see, for example, B. H. G. Elias, Makromoleküle [Macromolecules], Volume 2, Technologie [Technology], 5th Edition, 1992, pages 99 ff.).

The resultant microgels can be worked up by way of example via evaporated concentration or via coagulation or via co-coagulation with another latex polymer, or via freeze coagulation (cf. U.S. Pat. No. 2,187,146) or via spray drying. In the case of work-up via spray drying it is also possible to add commercially available flow aids, such as $CaCO_3$ or silica.

In one preferred embodiment, the inventive vulcanizable composition comprises
- a) 100 parts by weight of one or more hydrogenated nitrile rubbers,
- b) from 1 to 100 parts by weight, preferably from 5 to 80 parts by weight,
  of one or more unsaturated mono- or dicarboxylic acids having from 3 to 10 carbon atoms and/or of one or more salts thereof, preferably zinc diacrylate or zinc methacrylate,
- c) from 0.2 to 8 parts by weight, preferably from 0.2 to 5 parts by weight, particularly preferably from 0.2 to 4 parts by weight,
  of one or more peroxides, preferably dicumyl peroxide, tert-butyl cumyl peroxide, bis(tert-butylperoxyisopropyl)benzene, di-tert-butyl peroxide, 2,5-dimethylhexane 2,5-dihydroperoxide, 2,5-dimethylhex-3-yne 2,5-dihydroperoxide or dibenzoyl peroxide,
- d) from 5 to 60 parts by weight, preferably from 10 to 50 parts by weight,
  of one or more microgels, preferably a BR or SBR microgel, whose glass transition temperature $T_g$ is below $-20°$ C., preferably whose glass transition temperature $T_g$ is below $-50°$ C. and
- e) from 0 to 100 parts by weight, preferably from 5 to 80 parts by weight,
  of one or more conventional rubber additives, preferably one or more fillers, in particular carbon black, silica, zinc oxide, magnesium oxide or aluminium oxide, of one or more filler activators, in particular based on an organic silane, of one or more antioxidants, in particular oligomerized 2,2,4-trimethyl-1,2-dihydroquinoline (TMQ), styrenated diphenylamine (DDA), octylated diphenylamine (OCD) or zinc salt of 4- and 5-methylmercaptobenzimidazole (ZMB2) and/or of one or more mould-release agents.

Among conventional rubber additives are, by way of example:

Fillers, filler activators, accelerators, polyfunctional crosslinking agents, ozone stabilizers, antioxidants, processing oils, extender oils, plasticizers, activators, and also scorch inhibitors. It is also possible to reinforce the vulcanisates with reinforcement materials composed of glass according to the teaching of U.S. Pat. No. 4,826,721, or else to use aromatic polyamides (Aramid®) for reinforcement.

Examples of fillers that can be used are carbon black, silica, barium sulphate, titanium dioxide, zinc oxide, calcium oxide, calcium carbonate, magnesium oxide, aluminium oxide, iron oxide, diatomaceous earth or silicates.

Particular filler activators that can be used are organic silanes, e.g. vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Examples of other filler activators are surfactant substances such as triethanolamine or ethylene glycols with molar masses of from 74 to 10 000 g/mol. The amount of filler activators is usually from 0.5 to 10 parts by weight, based on 100 phr of the hydrogenated nitrile rubber.

Antioxidants that can be used are in particular those giving minimum scavenging of free radicals during peroxidic vulcanization. These are in particular oligomerized 2,2,4-trimethyl-1,2-dihydroquinoline (TMQ), styrenated diphenylamine (DDA), octylated diphenylamine (OCD) or the zinc salt of 4- and 5-methylmercaptobenzimidazole (ZMB2). Alongside these, it is also possible to use the known phenolic antioxidants, examples being sterically hindered phenols or antioxidants based on phenylenediamine. It is also possible to use combinations of the antioxidants mentioned.

The amounts usually used of the antioxidants are from 0.1 to 5 parts by weight, preferably from 0.3 to 3 parts by weight, based on the total amount of polymer.

Examples of mould-release agents that can be used are: saturated or partially unsaturated fatty and oleic acids or their derivatives (in the form of fatty acid esters, fatty acid salts, fatty alcohols or fatty acid amides) and also products that can be applied to the mould surface, e.g. products based on low-molecular-weight silicone compounds, products based on fluoropolymers, and also products based on phenolic resins.

The amounts used of the mould-release agents as constituent of the mixture are from 0.2 to 10 parts by weight, preferably from 0.5 to 5 parts by weight, based on the total amount of polymer.

The invention further provides a process for preparation of the abovementioned vulcanizable compositions, by mixing components a, b, c and d, and also, if appropriate, e with one another. This can take place with use of apparatuses and mixing devices known to the person skilled in the art.

The invention further provides the production of vulcanized products by exposing the inventive vulcanizable compositions to heat treatment.

The vulcanized products are produced by exposing the inventive vulcanizable compositions in a conventional manner in suitable moulds to a temperature in the range which is preferably from 120 to 200° C., particularly preferably from 140 to 180° C.

The invention therefore also provides the vulcanized products obtainable via vulcanizing of the inventive compositions.

These vulcanized products are preferably drive belts, roll coverings, gaskets, hoses and cables.

The principles of production of these drive belts, roll coverings, gaskets, hoses and cables are known to the person skilled in the art. For production of drive belts, the person skilled in the art can proceed by way of example by analogy with the disclosure of U.S. Pat. No. 4,715,607, using the inventive vulcanizable compositions.

EXAMPLES

Preparation Examples for the Microgels

The preparation of the microgels used in the remaining examples is described below.

Microgels A and B were prepared via emulsion polymerization, using the following monomers: butadiene, styrene, trimethylolpropane trimethacrylate (TMPTMA) and hydroxyethyl methacrylate (HEMA). The monomers used for preparation of the microgels, and also substantial constituents of the mixing specification, have been collated in Table 1 below:

TABLE 1

Composition of microgels A and B used

| Microgel | Water Initiation [g] | Water Activation [g] | Water Termination [g] | Emulsifiers Mersolat K30/95[1) [g] | Emulsifiers TCD[2) (20%) [g] | Monomers Butadiene [g] | Monomers Styrene [g] | Monomers TMPTMA (90%) [g] | Monomers HEMA (96%) [g] |
|---|---|---|---|---|---|---|---|---|---|
| A ($T_g = -75°$ C.) | 12608 | 287 | 530 | 137 | 250 | 3805.5 | 0 | 172 | 322.5 |
| B ($T_g = -65°$ C.) | 13742 | 251 | 125 | 137 | 250 | 2740.5 | 304.5 | 105 | 350.0 |

[1)]Mersolat ® K 30/95 (Lanxess Deutschland GmbH): Isomeric mixture of the sodium salts of long-chain alkylsulphonic acids. Content of active substance is 95% by weight.
[2)]TCD Sodium salt of reaction product of bishydroxyformylated dicyclopentadiene with hexahydrophthalic anhydride. An aqueous solution is used with 20% by weight of active substance. (The emulsifier was prepared according to US-A-5,100,945).

For preparation of the microgels, the amounts stated in Table 1 of the emulsifiers Mersolat® K30/95 and TCD were first dissolved in water and used as initial charge in a 40 l autoclave. The autoclave was evacuated three times and treated with nitrogen. The monomers stated in Table 1 were then added. The monomers were emulsified in the emulsifier solution at 30° C., with stirring.

An aqueous solution composed of 171 g of water, 1.71 g of ethylenediaminetetraacetic acid (Merck-Schuchardt), 1.37 g of ferrous sulphate*7H$_2$O, 3.51 g of sodium formaldehydesulphoxylate hydrate (Merck-Schuchardt), and also 5.24 g of trisodium phosphate*12H$_2$O was then metered in. The amount of water used for this is stated in the column "Initiation" in Table 1.

The reaction was initiated via addition of 5.8 g of p-menthane hydroperoxide, 50% (Trigonox® NT 50 from Akzo-Degussa), which was emulsified by means of 10.53 g of Mersolat® K30/95 in half of the amount of water listed in the "Activation" column.

After 2.5 hours of reaction time, the reaction temperature was increased to 40° C. After another hour of reaction time, post-activation was carried out using an amount of initiator solution (Trigonox® NT50/water/Mersolat®K30/95) identical with that used for initiation of the polymerization process. The polymerization temperature was increased to 50° C. here.

On reaching >95% polymerization conversion, the polymerization process was terminated via addition of 23.5 g of diethylhydroxylamine. For this, diethylhydroxylamine was dissolved in the amount of water listed in the "Termination" column in Table 1.

Unreacted monomers were then removed from the latex via steam-stripping. The latex was filtered and, as in Example 2 of U.S. Pat. No. 6,399,706, stabilizer was admixed with the mixture, which was coagulated and dried.

The gels were characterized both in the latex state by means of ultracentrifugation (diameter and specific surface area) and also in the form of solid product with respect to solubility in toluene (gel content, swelling index/SI), via acidimitric titration (OH number and COOH number) and by means of DSC (glass transition temperature/$T_g$ and width of $T_g$ transition).

The characteristic data for the microgels have been collated in Table 2 below:

TABLE 2

Properties of microgels A and B

| Microgel | Diameter $d_{10}$ [nm] | Diameter $d_z$ [nm] | Diameter $d_{80}$ [nm] | $SA_{spec.}$ [m$^2$/g] | Gel content [% by wt.] | SI | $T_g$ [° C.] | $\Delta T_g$ [° C.] | OH number [mg$_{KOH}$/g$_{pol.}$] | Acid number [mg$_{KOH}$/g$_{pol.}$] |
|---|---|---|---|---|---|---|---|---|---|---|
| A | 43.5 | 50.9 | 55.7 | 127 | 91.7 | 13.1 | −75 | 15.2 | 33 | 7.4 |
| B | 35.4 | 48.2 | 55.1 | 139 | 94.8 | 7.4 | −65.5 | 12 | 37.8 | 8.6 |

In Table 2:
$SA_{spec.}$: is specific surface area in m$^2$/g $d_z$: The diameter $\bar{d}_z$ is according to DIN 53 206 defined as the median or central value above and below which in each case half of all of the particle sizes lies. The particle diameter of the latex particles is determined by means of ultracentrifugation (W. Scholtan, H. Lange, "Bestimmung der Teilchengrößenverteilung von Latices mit der Ultrazentrifuge" [Determination of particle size distribution of latices using the ultracentrifuge], Kolloid-Zeitschrift und Zeitschrift für Polymere (1972) Volume 250, No. 8). The diameter data in the latex and for the primary particles in the inventive compositions are practically identical, since the particle size of the microgel particles exhibits practically no change during preparation of the inventive composition. .

$d_{10}$ and $d_{80}$: The diameter data $d_{10}$ and $d_{80}$ indicate that the diameter of respectively 10 and 80% by weight of the particles is smaller than the stated value, the particle size distribution here being determined by means of ultracentrifugation. The diameter data in the latex and for the primary particles in the inventive compositions are practically identical, since the particle size of the microgel particles exhibits practically no change during preparation of the inventive composition.

$T_g$: Glass transition temperature. This was determined as mentioned above in the application.

$\Delta T_g$: Width of Tg transition

This was determined as mentioned above in the application.

Perkin-Elmer DSC-2 equipment is used for determination of $T_g$ and $\Delta T_g$.

SI: is swelling index.

This was determined as follows:

The swelling index is calculated from the weight of the solvent-containing microgel swollen for 24 hours in toluene at 23° and the weight of the dry microgel:

SI = wet weight of microgel/dry weight of microgel

TABLE 2-continued

Properties of microgels A and B

| Microgel | Diameter | | | $SA_{spec.}$ [m²/g] | Gel content [% by wt.] | SI | Tg [°C.] | ΔTg [°C.] | OH number [$mg_{KOH}$/ $g_{pol.}$] | Acid number [$mg_{KOH}$/ $g_{pol.}$] |
|---|---|---|---|---|---|---|---|---|---|---|
| | $d_{10}$ [nm] | $d_z$ [nm] | $d_{80}$ [nm] | | | | | | | |

To determine the swelling index, 250 mg of the microgel are swollen in 25 ml of toluene for 24 h, with shaking. The toluene-swollen (wet) gel is weighed after centrifuging at 20 000 rpm and then dried at 70° C. to constant weight and again weighed.
OH number: is hydroxy number
The OH number is determined to DIN 53240 and corresponds to the amount, of KOH in mg equivalent to the amount of acetic acid liberated during acetylation of 1 g of substance, using acetic anhydride.
Acid number: The acid number is determined as mentioned above to DIN 53402 and corresponds to the amount of KOH in mg required to neutralize 1 g of the polymer.
Gel content: The gel content corresponds to the fraction insoluble in toluene at 23° C. It is determined as described above.

Preparation, Vulcanization and Characterization of Rubber Mixtures

An internal mixer of capacity 1.5 l with intermeshing rotor geometry (Werner & Pfleiderer GK1.5E) was used to prepare the rubber mixtures. First, the hydrogenated nitrile rubber was added to the mixer. After 30 s, gel and zinc diacrylate were added and mixed at a constant rotor rotation rate of 40 rpm. After 4 min of mixing time, the mixture was discharged. After a storage time of 24 h, the mixture was again mixed at 40 rpm for 4 min. Perkadox® 14-40 B-GR, Vulkanox® ZMB2/5 and Rhenofit® DDA-70 were then incorporated by mixing on the roll at 40° C.

Examples 1-3 below are comparative examples, while Examples 4 and 5 are inventive examples.

TABLE 3

Composition of rubber mixtures in parts by weight

| | Rubber mixtures | | | | |
|---|---|---|---|---|---|
| | 1 | 2 | 3 | 4 | 5 |
| Therban ® A 3406 [1] | 100 | 100 | 100 | 100 | 100 |
| Microgel A | 0 | 0 | 0 | 10 | 0 |
| Microgel B | 0 | 0 | 0 | 0 | 10 |
| Saret ® SR633 [2] | 60 | 70 | 80 | 60 | 60 |
| Perkadox ® 14-40 B-GR [3] | 4 | 4 | 4 | 4 | 4 |
| Vulkanox ® ZMB2/5 [4] | 0.8 | 0.8 | 0.8 | 0.8 | 0.8 |
| Rhenofit ® DDA-70 [5] | 2 | 2 | 2 | 2 | 2 |

The following were used in Table 3:
[1] Hydrogenated nitrile rubber from Lanxess Deutschland GmbH with 34% by weight of acrylonitrile, ML (1 + 4@100° C.) = 77; residual double bond content: 3.5%
[2] Zinc diacrylate from Sartomer
[3] Dicumyl peroxide from Akzo in pellet form with 40% active ingredient content
[4] Zinc methylmercaptobenzimidazole from Lanxess Deutschland GmbH
[5] Octylated diphenylamine with 70% by weight active ingredient content from RheinChemie Rheinau GmbH The values stated in Table 4 were determined on the unvulcanized compounded materials:

TABLE 4

Properties of unvulcanized rubber mixtures

| | | Properties of compounded material: | | | | |
|---|---|---|---|---|---|---|
| | | 1 | 2 | 3 | 4 | 5 |
| Mooney viscosity (ML1 + 4/100° C.) to ASTM D1646 | [ME] | 40 | 37 | 32 | 39 | 42 |
| Mooney relaxation (MR) to ISO 289, Part 4 | [%] | 6.7 | 6.9 | 7.4 | 6 | 7.4 |

The results show that the inventive rubber mixtures (4 and 5) are comparable in terms of Mooney viscosity and Mooney relaxation with the reference vulcanisates (1, 2 and 3).

The vulcanization performance of the mixtures was studied to ASTM D5289 at 180° C. with the aid of the MDR2000 Moving Die Rheometer from Alpha Technology. The characteristic vulcameter values $F_a$, $F_{max}$, $F_{max}$-$F_a$, $t_{10}$, $t_{50}$ $t_{90}$ and $t_{95}$ were thus determined.

TABLE 5

Vulcanization performance of rubber mixtures

| | | Mixture No.: | | | | |
|---|---|---|---|---|---|---|
| | | 1 | 2 | 3 | 4 | 5 |
| $F_a$ | [dNm] | 1.7 | 1.4 | 1.5 | 0.6 | 1.8 |
| $F_{max}$ | [dNm] | 29.3 | 32.5 | 39 | 31 | 31.4 |
| $F_{max} - F_a$ | [dNm] | 27.6 | 31.1 | 37.5 | 30.4 | 29.6 |
| $t_{10}$ | [min] | 0.8 | 0.9 | 0.95 | 0.9 | 0.8 |
| $t_{50}$ | [min] | 1.3 | 1.3 | 1.4 | 1.3 | 1.3 |
| $t_{90}$ | [min] | 5.1 | 4.6 | 4.7 | 4.7 | 5.3 |
| $t_{95}$ | [min] | 6.9 | 6.3 | 6.4 | 6.9 | 7.5 |

According to DIN 53 529, Part 3:
$F_a$: is the indicated vulcameter value at the minimum of the crosslinking isotherm
$F_{max}$: is the maximum indicated vulcameter value
$F_{max} - F_a$: is the difference between maximum and minimum of the indicated vulcameter values
$t_{10}$: is the juncture at which 10% of final conversion has been achieved
$t_{50}$: is the juncture at which 50% of final conversion has been achieved
$t_{90}$: is the juncture at which 90% of final conversion has been achieved
$t_{95}$: is the juncture at which 95% of final conversion has been achieved The series of experiment shows that the inventively prepared rubber mixtures (4 and 5) have vulcanization performance comparable with that of the reference mixtures (1, 2 and 3).

The rubber mixtures were then vulcanized for 9 min at 180° C. at a pressure of 170 bar in a platen press. The test values stated in Table 6 were determined on the unaged vulcanisates at 23° C.

TABLE 6

Properties of vulcanized rubber mixtures at 23° C.

| | | Vulcanisate properties at 23° C. (without ageing) | | | | |
|---|---|---|---|---|---|---|
| | | 1 | 2 | 3 | 4 | 5 |
| Shore A hardness DIN 53505 | [ShA] | 75 | 74 | 78 | 79 | 77 |
| DIN 53512 rebound resilience | [%] | 48 | 46 | 46 | 48 | 47 |
| DIN 53516 abrasion | [mm³] | 66 | 83 | 107 | 70 | 79 |
| DIN 53504 tensile strain at break ($\epsilon_b$) | [%] | 399 | 417 | 410 | 357 | 372 |
| DIN 53504 ultimate tensile strength ($\sigma_{max.}$) | [MPa] | 25.7 | 22.3 | 19.9 | 27 | 24.0 |
| DIN 53504 tensile stress at 25% tensile strain ($\sigma_{25}$) | [MPa] | 2.2 | 2.3 | 2.6 | 2.7 | 2.5 |
| DIN 53504 tensile stress at 100% tensile strain ($\sigma_{100}$) | [MPa] | 5.2 | 5.8 | 6.3 | 6.4 | 6.2 |
| DIN 53504 tensile stress at 300% tensile strain ($\sigma_{300}$) | [MPa] | 15.8 | 14.3 | 14.0 | 21.3 | 17.8 |

The series of experiment shows that the inventively prepared vulcanisates (4 and 5) are at least equivalent to the reference vulcanisates (1, 2 and 3) in terms of Shore A hardness, rebound resilience and abrasion.

The test values stated in Table 7 were also determined on the unaged specimens at 130° C.

TABLE 7

Properties of vulcanized rubber mixtures at 130° C.

| | | Vulcanisate properties at 130° C. (without ageing) | | | | |
|---|---|---|---|---|---|---|
| | | 1 | 2 | 3 | 4 | 5 |
| DIN 53504 tensile strain at break ($\epsilon_b$) | [%] | 184 | 171 | 169 | 187 | 168 |
| DIN 53504 ultimate tensile strength ($\sigma_{max.}$) | [MPa] | 4.8 | 3.7 | 3.7 | 5 | 4.5 |
| DIN 53504 tensile stress at 25% tensile strain ($\sigma_{25}$) | [MPa] | 1.4 | 1.2 | 1.5 | 1.6 | 1.6 |

TABLE 7-continued

Properties of vulcanized rubber mixtures at 130° C.

| | | Vulcanisate properties at 130° C. (without ageing) | | | | |
|---|---|---|---|---|---|---|
| | | 1 | 2 | 3 | 4 | 5 |
| DIN 53504 tensile stress at 100% tensile strain ($\sigma_{100}$) | [MPa] | 3.3 | 2.9 | 3.5 | 3.5 | 3.7 |
| $\sigma_{25} \times \epsilon_b$ | [MPa] × [%] | 258 | 205 | 233 | 299 | 268 |
| $\sigma_{100} \times \epsilon_b$ | [MPa] × [%] | 607 | 496 | 592 | 655 | 622 |

The series of experiment shows that the inventively prepared vulcanisates (4 and 5) are slightly superior to the reference vulcanisates (1, 2 and 3) with respective to ultimate tensile strength and are markedly superior with respect to the product $\sigma_{25} \times \epsilon_b$ and $\sigma_{100} \times \epsilon_b$.

To characterize performance, all of the vulcanisates were then aged at 150° C. for 7 days to DIN 53508.

The values stated in Table 8 were then determined at a test temperature of 130° C.

TABLE 8

Properties of vulcanized rubber mixtures after ageing at 150° C./7 days (test temperature: 130° C.)

| | | Vulcanisate properties at 130° C. (after 7 days ageing at 150° C.) | | | | |
|---|---|---|---|---|---|---|
| | | 1 | 2 | 3 | 4 | 5 |
| DIN 53504 tensile strain at break ($\epsilon_b$) | [%] | 158 | 168 | 149 | 148 | 145 |
| DIN 53504 ultimate tensile strength ($\sigma_{max.}$) | [MPa] | 5.6 | 5.6 | 5.8 | 6 | 5.8 |
| DIN 53504 tensile stress at 25% tensile strain ($\sigma_{25}$) | [MPa] | 1.8 | 1.8 | 2.1 | 2.2 | 2.2 |
| DIN 53504 tensile stress at 100% tensile strain ($\sigma_{100}$) | [MPa] | 4.2 | 4.2 | 4.6 | 5.0 | 5.1 |
| $\sigma_{25} \times \epsilon_b$ | [MPa] × [%] | 284 | 302 | 313 | 326 | 319 |
| $\sigma_{100} \times \epsilon_b$ | [MPa] × [%] | 664 | 705 | 685 | 740 | 740 |

The series of experiment shows that the inventively prepared vulcanisates (4 and 5) are superior to the reference vulcanisates (1, 2 and 3) with respect to the product $\sigma_{25} \times \epsilon_b$ and $\sigma_{100} \times \epsilon_b$, after 7 days of hot-air ageing at 150° C. (test temperature: 130° C.).

Each of the physical parameters was determined according to the relevant DIN specifications. Supplementary reference is made to Kleemann, Weber, Formeln und Tabellen für die Elastomerverarbeitung [Formulae and tables for elastomer processing], Dr Gupta Verlag, 1994.

What is claimed is:

1. A vulcanizable composition comprising:
   a) 100 parts by weight, based on 100 parts by weight of rubber, of one or more hydrogenated nitrile rubbers having a Mooney viscosity (ML 1+4 @ 100° C.) of 10 to 120 MU, wherein the one or more hydrogenated nitrile rubbers are co- or terpolymers based on at least one conjugated diene and at least one $\alpha,\beta$-unsaturated nitrile monomer, in which the degree of hydrogenation of the diene units incorporated into the sot mar is 95 to 100%;
   b) 1 to 100 parts by weight, based on 100 parts by weight of rubber, one or more unsaturated carboxylic acids and/or one or more salts thereof;
   c) 0.2 to 8 parts by weight, based on 100 parts by weight of rubber, at least one peroxide; and
   d) at least one microgel having a glass transition temperature less than or equal to $-20°$ C.

2. The vulcanizable composition according to claim 1, wherein the composition comprises up to 60 parts by weight, based on 100 parts by weight of rubber, of the at least one microgel.

3. The vulcanizable composition according to claim 1 or 2, wherein the Mooney viscosity is determined to ASTM standard D1646, and the at least one micro has a glass transition temperature less than or equal to $-50°$ C.

4. The vulcanizable composition according to claim 1 or 2, wherein the Mooney viscosity (ML 1+4 @ 100° C.) is 15 to 100 MU determined to ASTM standard D1646.

5. The vulcanizable composition according to claim 1 or 2, wherein the unsaturated carboxylic acid comprises an $\alpha,\beta$-ethylenically unsaturated mono- or dicarboxylic acid having from 3 to 10 carbon atoms.

6. The vulcanizable composition according to claim 1 or 2, wherein the one or more unsaturated carboxylic acids are selected from the group consisting of methacrylic acid, acrylic acid, cinnamic acid, crotonic acid and itaconic acid, and the one or more salts are selected from the group consisting of sodium, potassium, magnesium, calcium, zinc, barium, aluminium, tin, zirconium and lithium.

7. The vulcanizable composition according to claim 1 or 2, wherein component b) comprises one or more diacrylates and/or dimethacrylates of sodium, potassium, magnesium, calcium, zinc, barium, aluminum, tin, zirconium and lithium.

8. The vulcanizable composition according to claim 1 or 2, wherein component b) comprises at least one of zinc diacrylate and zinc dimethacrylate.

9. The vulcanizable composition according to claim 1 or 2, wherein the at least one peroxide is an organic peroxide.

10. The vulcanizable composition according to claim 1 or 2, wherein the at least one peroxide is a peroxide selected from the group consisting of dicumyl peroxide, tert-butyl cumyl peroxide, bis(tert-butylperoxyisopropyl)benzene, di-tert-butyl peroxide, 2,5-dimethylhexane 2,5-dihydroperoxide, 2,5-dimethylhex-3-yne 2,5-dihydroperoxide, dibenzoyl peroxide, bis(2,4-dichlorobenzoyl) peroxide, tert-butyl perbenzoate, butyl 4,4-di(tert-butylperoxy)valerate and 1,1-bis(tert-butylperoxy)-3,3,5-trimethylcyclohexane.

11. The vulcanizable composition according to claim 1 or 2, wherein the at least one microgel is a crosslinked homopolymer or crosslinked random copolymer.

12. The vulcanizable composition according to claim 1 or 2, wherein the at least one microgel has at least 70% by weight of fractions ("gel content") insoluble in toluene at 23° C.

13. The vulcanizable composition according to claim 1 or 2, wherein the at least one microgel has a swelling index ("SI") in toluene at 23° C. of less than 80, where the swelling index is calculated from the weight of the solvent-containing microgel swollen for 24 hours in toluene at 23° C. (after centrifuging at 20 000 rpm) and the weight of the dry microgel by using the following formula:

$$SI = \text{wet weight of microgel/dry weight of microgel.}$$

14. The vulcanizable composition according to claim 1 or 2, wherein the at least one microgel has a glass transition temperature of $-100°$ C. to $-20°$ C.

15. The vulcanizable composition according to claim 1 or 2, wherein the at least one microgel is selected from the group consisting of BR (polybutadiene), IR (polyisoprene), SBR (random styrene-butadiene copolymers with styrene contents of 1-60% by weight, preferably 5-50% by weight), X-SBR (carboxylated styrene-butadiene copolymers), FKM (fluororubber), ABR (butadiene-C1-4-alkyl acrylate copolymers), ACM (acrylate rubber), NBR (butadiene-acrylonitrile copolymers with acrylonitrile contents of 5-60% by weight, preferably 10-50% by weight), X-NBR (carboxylated nitrile rubbers), CR (polychloroprene), IIR (isobutylene-isoprene copolymers with isoprene contents of 0.5-10% by weight), BIIR (bromated isobutylene-isoprene copolymers with bromine contents of 0.1-10% by weight), CIIR (chlorinated isobutylene-isoprene copolymers with chlorine contents of 0.1-10% by weight), HNBR (partially and/or fully hydrogenated nitrile rubbers), EPDM (ethylene-propylene-diene copolymers), EAM (ethylene-acrylate copolymers), EVM (ethylene-vinyl acetate copolymers), CO and ECO (epichlorohydrin rubbers), Q (silicone rubbers), AU (polyester urethane polymers), EU (polyether urethane polymers), ENR (epoxidized natural rubber) and mixtures thereof.

16. The vulcanizable composition according to claim 1 or 2, wherein the composition comprises:
   a) 100 parts by weight of the one or more hydrogenated nitrile rubbers,
   b) 1 to 100 parts by weight of the one or more unsaturated carboxylic acids and/or of one or more salts thereof;
   c) 0.2 to 8 parts by weight of the at least one peroxide;
   d) 5 to 60 parts by weight of the at least one microgel; and
   e) 0 to 100 parts by weight of one or more conventional rubber additives.

17. A process for the preparation of the vulcanizable compositions according to claim 1 or 2, wherein components a, b, c and d are mixed with one another.

18. A process for the production of vulcanized products, the process comprising exposing the vulcanizable composition according to claim 1 or 2 to heat treatment.

19. The process according to claim 18, wherein the exposing comprises heating the vulcanizable composition in moulds to a temperature of 120 to 200° C.

20. A vulcanized product obtained by the process of claim 19.

21. The vulcanized product according to claim 20, wherein the product is a drive belt, a roll covering, a gasket, a hose or a cable.

22. The vulcanizable composition according to claim 1, wherein the one or more hydrogenated nitrile rubbers are co- or terpolymers based on at least one conjugated diene, at least one $\alpha,\beta$-unsaturated nitrile monomer, and at least one additional copolymerizable monomer.

* * * * *